(12) United States Patent
Komatsu

(10) Patent No.: US 6,400,436 B1
(45) Date of Patent: *Jun. 4, 2002

(54) IN-PLANE SWITCHING MODE LIQUID CRYSTAL DISPLAY DEVICE WITH SPECIFIC ARRANGEMENT OF COMMON BUS LINE, DATA ELECTRODE AND COMMON ELECTRODE

(75) Inventor: Hiroshi Komatsu, Kyungsangbuk-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 85 days.

This patent is subject to a terminal disclaimer.

(21) Appl. No.: 09/613,730

(22) Filed: Jul. 11, 2000

Related U.S. Application Data (63) Continuation of application No. 09/116,707, filed on Jul. 17, 1998, now Pat. No. 6,335,770.

(30) Foreign Application Priority Data

Jul. 22, 1997 (KR) ............................................. 97-34196
Jul. 31, 1997 (KR) ............................................. 97-36569

(51) Int. Cl.[7] ............................................. G02F 1/1343
(52) U.S. Cl. ......................... 349/141; 349/38; 349/138
(58) Field of Search ........................... 349/38, 39, 42, 349/43, 141, 138

(56) References Cited

U.S. PATENT DOCUMENTS

| | | | | |
|---|---|---|---|---|
| 5,309,264 A | * | 5/1994 | Lien et al. ................... | 349/130 |
| 5,321,535 A | | 6/1994 | Ukai et al. .................... | 359/55 |
| 5,459,596 A | * | 10/1995 | Ueda et al. .................... | 349/39 |
| 5,576,858 A | * | 11/1996 | Ukai et al. .................... | 349/42 |
| 5,646,705 A | * | 7/1997 | Higuchi et al. ................ | 349/43 |
| 5,760,856 A | * | 6/1998 | Yanagawa et al. ............ | 349/42 |
| 5,760,857 A | | 6/1998 | Yanagawa et al. ............ | 349/43 |
| 5,781,261 A | | 7/1998 | Ohta et al. .................... | 349/111 |
| 5,786,876 A | | 7/1998 | Ota et al. ..................... | 349/42 |
| 5,818,560 A | | 10/1998 | Kouno et al. ................. | 349/129 |
| 5,852,485 A | * | 12/1998 | Shimada et al. ............. | 349/141 |
| 5,886,762 A | | 3/1999 | Lee et al. ..................... | 349/141 |
| 5,907,379 A | * | 5/1999 | Kim et al. .................... | 349/110 |
| 5,946,060 A | | 8/1999 | Nishiki et al. ................ | 349/48 |
| 5,995,186 A | * | 11/1999 | Hiroshi ........................ | 349/128 |
| 6,091,473 A | | 7/2000 | Hebiguchi .................... | 349/141 |
| 6,281,957 B1 | * | 8/2001 | Oh et al. ...................... | 349/141 |
| 6,285,431 B2 | * | 9/2001 | Lyu et al. ..................... | 349/129 |

FOREIGN PATENT DOCUMENTS

| | | |
|---|---|---|
| JP | 7-36058 | 2/1995 |
| JP | 7-225388 | 8/1995 |
| JP | 9-5793 | 1/1997 |

OTHER PUBLICATIONS

M. Ohta et al. "Development of Super–TFT–LCDs with In–Plane Switching Display Mode", Asia Display (1995), pp. 707–710.

R. Keifer et al. "In–Plane Switching of Nematic Liquid Crystals", Japan Display (1992), pp. 547–550.

* cited by examiner

*Primary Examiner*—William L. Sikes
*Assistant Examiner*—Tarifur R. Chowdhury
(74) *Attorney, Agent, or Firm*—Long Aldridge & Norman LLP

(57) ABSTRACT

An in-plane switching mode liquid crystal display device. The device comprises first and second substrates, a plurality of gate and data bus lines formed on the first substrate to define a plurality of pixel regions, a common bus line aligned in each pixel regions of the first substrate, a thin film transistor (TFT) formed at each pixel regions of the first substrate, a data electrode which is formed on a gate insulator of the TFT and has a portion overlying the common bus line for forming a first storage capacitor, a passivation layer formed over the data electrode and the TFT, a common electrode which is formed on the passivation layer so as to overlap the gate and data bus lines and has a portion overlying the data electrode for forming a second storage capacitor, and a liquid crystal layer formed between the first and second substrates.

27 Claims, 14 Drawing Sheets

FIG. 12

IN-PLANE SWITCHING MODE LIQUID CRYSTAL DISPLAY DEVICE WITH SPECIFIC ARRANGEMENT OF COMMON BUS LINE, DATA ELECTRODE AND COMMON ELECTRODE

This application is a Continuation of application Ser. No. 09/116,707 Filed on Jul. 17, 1998 now U.S. Pat. No. 6,335,770.

BACKGROUND OF THE INVENTION

A. Field of the Invention

The present invention relates to a liquid crystal display device, and more particularly to an in-plane switching mode liquid crystal display device.

B. Description of the Related Art

Recently, the thin film transistor liquid crystal display devices (TFT LCDs) have been used as display devices in such applications as portable televisions and notebook computers, but these TFT LCDs have small viewing angles.

In order to solve this problem, twisted nematic LCDs having, for example, optical compensation plates and multi-domains, have been introduced. In these LCDs, however, the color of the image is shifted because the contrast ratio depends on the viewing angle direction.

For a wide viewing angle, the in-plane switching mode LCD is disclosed, for example, in JAPAN DISPLAY 92 page 547, Japanese Patent Unexamined Publication No. 7-36058, Japanese Patent Unexamined Publication No. 7-225388, and ASIA DISPLAY 95 page 707.

Figure 1A:
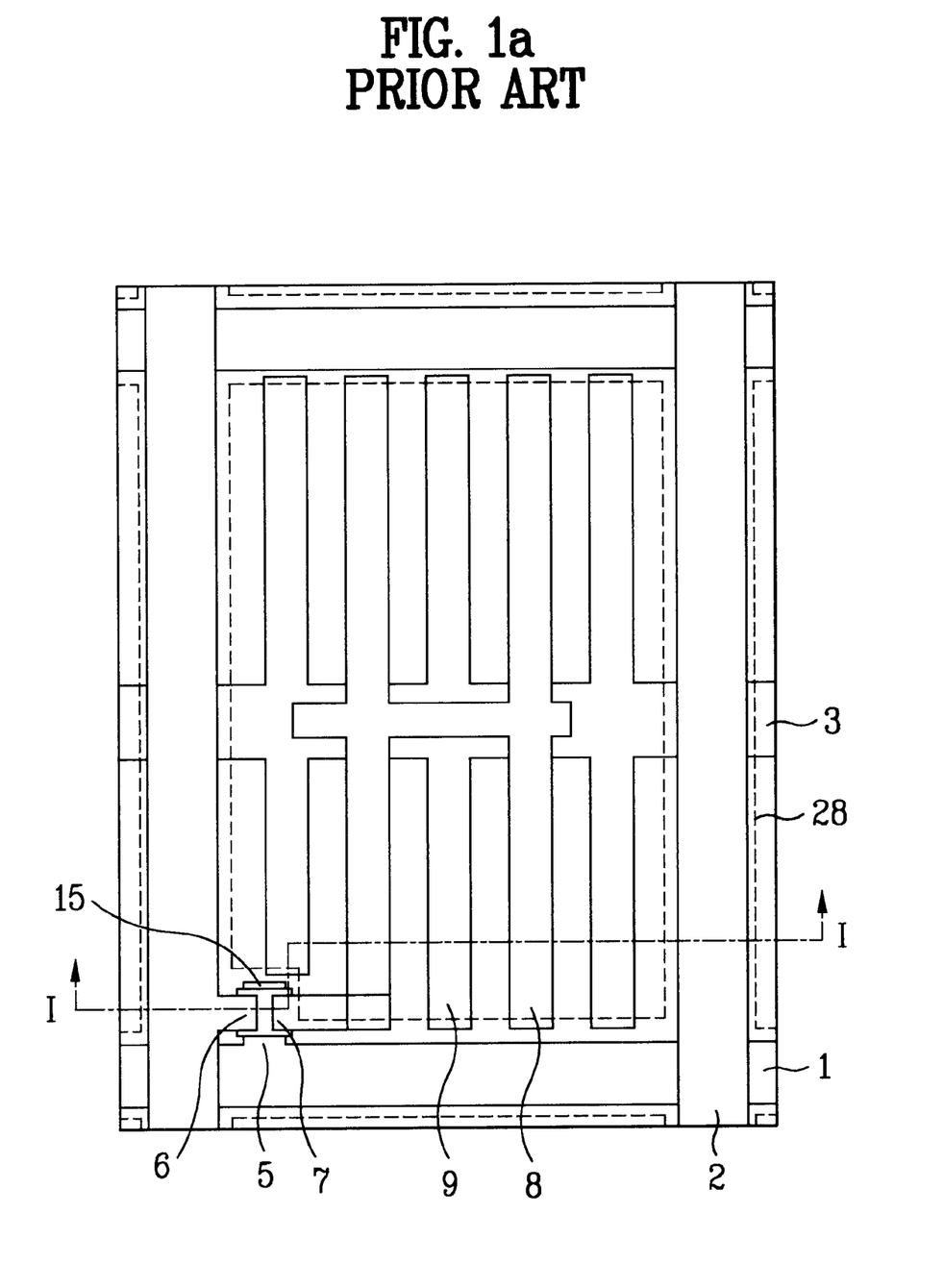
FIG. 1a and FIG. 1b are respectively plane and sectional views of the conventional in-plane switching mode liquid crystal display device.
Figure 1B:
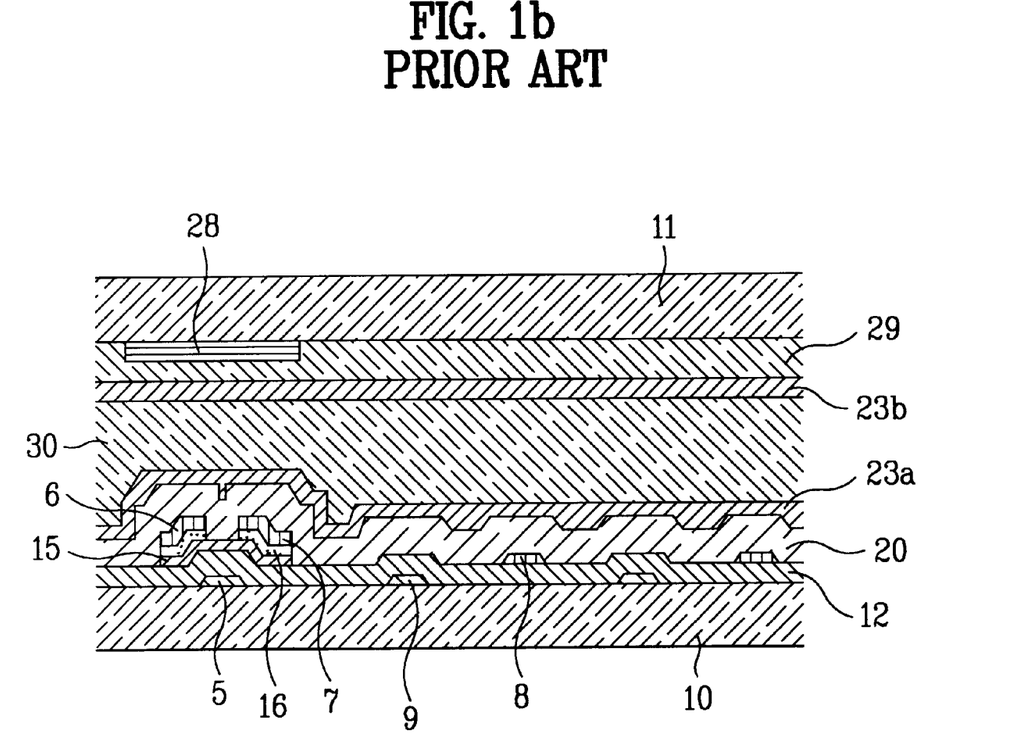

FIG. 1a and FIG. 1b are respectively plane and sectional views of the conventional in-plane switching mode liquid crystal display device (IPS mode LCD). FIG. 1b is a sectional view taken along line A–A' of FIG. 1a. As shown in these figures, a gate bus line 1 and a data bus line 2 are formed on a first substrate 10, defining a pixel. Although only one pixel is shown in the figures, a liquid crystal display device generally has a plurality of pixels. A common bus line 3 is aligned in the pixel, being parallel to gate bus line 1. A thin film transistor (TFT) is disposed at the intersection of gate and data bus lines 1 and 2. As shown in FIG. 1b, the TFT comprises a gate electrode 5, a gate insulator 12, a semiconductor layer 15, and an n+ semiconductor layer 16, a source electrode 6, and a drain electrode 7. In the pixel, a data electrode 8 and a common electrode 9 are formed parallel to data bus line 2. A portion of data electrode 8 which overlaps common bus line 3 is formed to obtain a storage capacitor, which functions as maintaining a grey level voltage applied into data electrode 8. Common electrode 9 is connected to common bus line 3. Data electrode 8 is formed on gate insulator 12 and is connected to drain electrode 7. The TFT, data electrode 8 and gate insulator 12 are covered with a passivation layer 20. Thereon, a first alignment layer 23a is coated to determine the alignment direction.

On a second substrate 11, a black mask 28 is formed to prevent a leakage of light through the regions of the TFT and gate and data bus lines 1 and 2. Thereon, a color filter layer 29 and a second alignment layer 23b are formed. Between first and second substrates 10 and 11, a liquid crystal layer 30 is formed.

When a voltage is applied to the conventional IPS mode LCD, electric field parallel to substrates 10 and 11 is generated between data and common electrodes 8 and 9. Liquid crystal molecules in the pixel are rotated according to the electric field, controlling the amount of light passing through liquid crystal layer 30.

However, the conventional IPS mode LCD has the following problems.

First, because the area for storage capacitor occupies quite a portion of the pixel region and because the data and common electrodes are made of opaque metals, the aperture ratio is lowered.

Second, because the electric field applied to the LC layer is weakened by both gate insulator 12 and passivation layer 20 formed over two electrodes 8 and 9, the driving speed of the LC molecules is decreased, and consequently the driving voltage is increased.

Third, because data bus line 2 should be apart from the pixel region so as to avoid the crosstalk problem, the pixel region is decreased, thereby lowering the aperture ratio.

Fourth, when the black mask is formed on the second substrate, the fabricating cost is increased and the aperture ratio is lowered to compensate for the imprecise lamination of the two substrates.

SUMMARY OF THE INVENTION

An object of the present invention is to provide an in-plane switching mode liquid crystal display device wherein the aperture ratio is improved.

Another object of the present invention is to provide an in-plane switching mode liquid crystal display device wherein the driving voltage is decreased.

A further object of the present invention is to reduce the fabricating cost of provide an in-plane switching mode liquid crystal display device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the in-plane switching mode liquid crystal display device of the present invention comprises: a substrate; a plurality of gate and data bus lines over the substrate, defining a plurality of pixel regions; a common bus line aligned in the pixel regions; a gate insulator over the common bus line; a data electrode over the gate insulator and having a portion overlying the common bus line to form a first storage capacitor; a passivation layer over the data electrode; and a common electrode over the passivation layer at least partially overlying the gate and data bus lines and at least partially overlying the data electrode to form a second storage capacitor.

According to another aspect of the present invention, the in-plane switching mode liquid crystal display device comprises: a substrate; a plurality of gate and data bus lines over the substrate, defining a plurality of pixel regions; a common bus line aligned in the pixel regions; a gate insulator over the common bus line; a thin film transistor coupled to each of the pixel regions and including at least a part of the gate insulator; a data electrode over the gate insulator and having a portion overlying the common bus line to form a first storage capacitor; a passivation layer over the data electrode and the thin film transistor; a common electrode over the passivation layer and at least partially overlying the data electrode to form a second storage capacitor; and a metal layer over the passivation layer and the thin film transistor.

According to a further aspect of the present invention, the in-plane switching mode liquid crystal display device comprises: first and second substrates having a plurality of pixel regions; a common bus line aligned in the pixel regions; a first insulating layer over the common bus line; a data electrode over the first insulating layer and having a portion overlying the common bus line to form a first storage capacitor; a second insulating layer over the data electrode; a common electrode over the second insulating layer, the common electrode having one or more openings, at least one of the openings having a substantially rectangular shape with four corner areas, at least one corner area being cut at an angle, and the common electrode having a portion overlying the data electrode to form a second storage capacitor; and a liquid crystal layer formed between the first and second substrates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the figures.

FIG. 2b and FIG. 2c are respectively sectional views taken along line B–B' and C–C' of FIG. 2a;

FIG. 11b and FIG. 11c are respectively sectional views taken along lines E–E' and F–F' of FIG. 11a.

DETAILED DESCRIPTION

Hereinafter, in-plane switching mode LCDs according to the present invention are described in detail accompanying the figures.

Figure 2A:
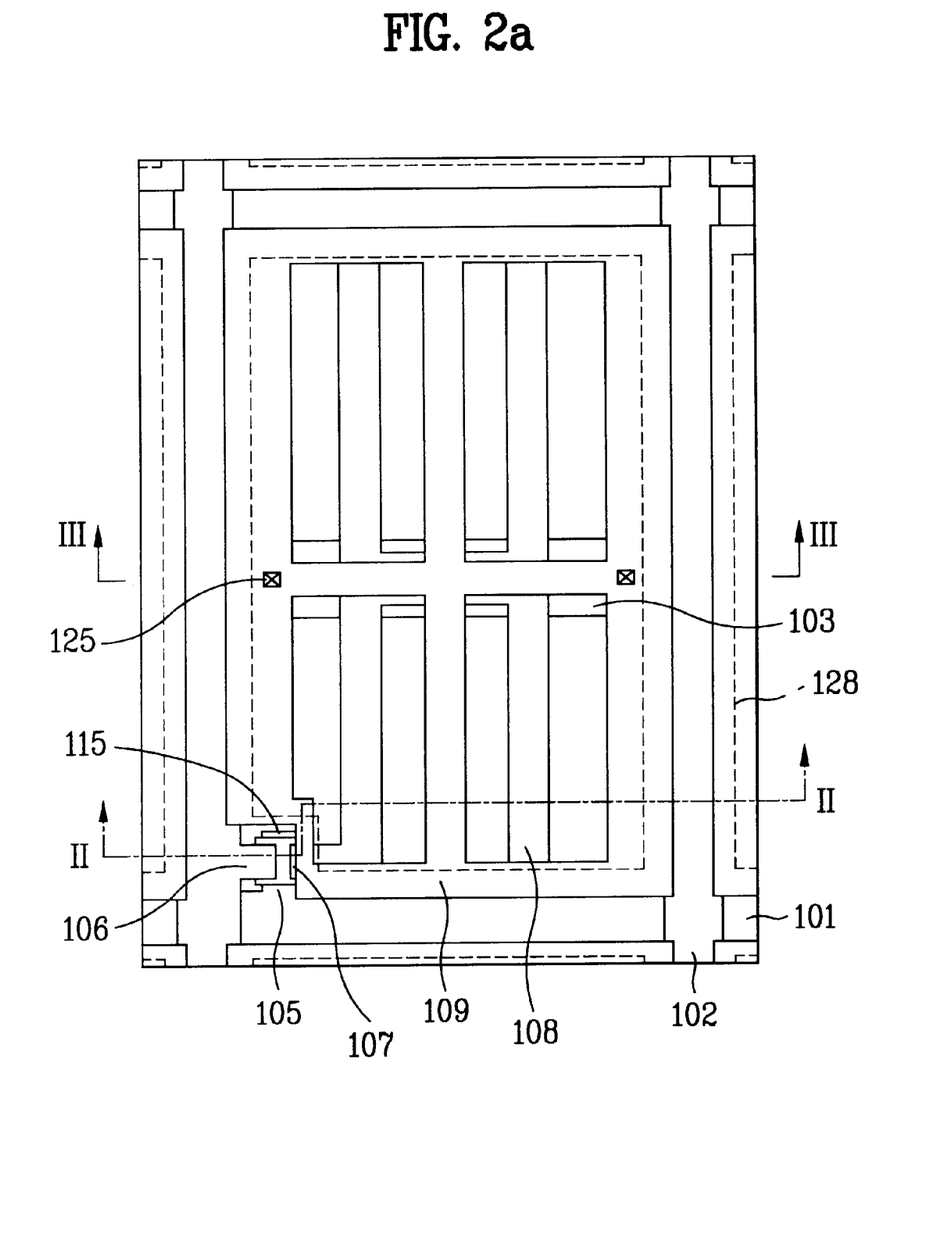
FIG. 2a is a plane view showing a first embodiment of the present invention.
Figure 2B:
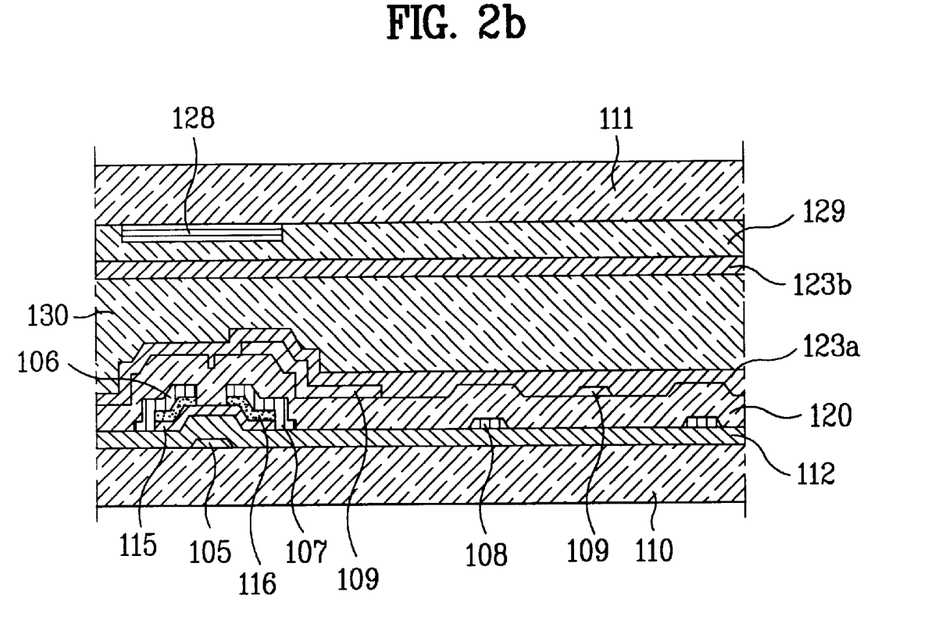
Figure 2C:
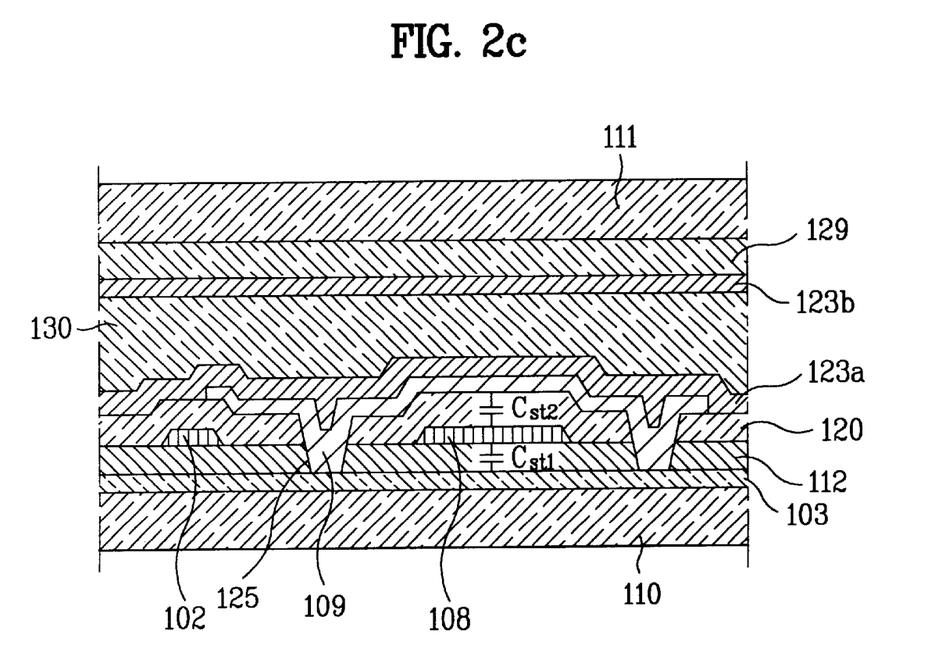

FIG. 2a, FIG. 2b and FIG. 2c are views showing a first embodiment according to the present invention, where FIG. 2b and FIG. 2c are respectively sectional views taken along line B–B' and line C–C' of FIG. 2a. As shown in these figures, gate and data bus lines 101 and 102 are formed on a first substrate 110, defining a pixel. Although only one pixel is drawn in these figures, the liquid crystal display device generally has a plurality of pixels. In the pixel, a common bus line 103 is formed parallel to gate bus line 101. At the intersection of gate and data bus lines 101 and 102, a thin film transistor (TFT) is formed as shown in FIG. 2b which comprises a gate electrode 105, a gate insulator 112, a semiconductor layer 115, an $n^+$ semiconductor layer 116, a source electrode 106, and a drain electrodes 107. In the pixel, data and common electrodes 108 and 109 are disposed parallel to data bus line 102. Over the TFT and data electrode 108, a passivation layer 120 is formed, and common electrode 109 is formed thereon to be parallel to data electrode 108 and overlap gate and data bus lines 102 and 103. Over common electrode 109 and passivation layer 120, a first alignment layer 123a is formed.

As in the conventional IPS mode LCD, data electrode 108 has a portion overlapping common bus line 103 for obtaining a first storage capacitor ($C_{st1}$) as shown in FIGS. 2a and 2c. In addition, common electrode 109 has a portion overlapping data electrode 108 for obtaining a second storage capacitor ($C_{st2}$).

Common electrode 109 is connected to common bus line 103 through a first hole 125 which is formed in passivation layer 120 and gate insulator (layer) 112. Common electrode 109 also overlaps gate and data bus lines 101 and 102. Thus, it functions to block the electric effect of two bus lines 101 and 102 to prevent the crosstalk problem.

Gate electrode 105, gate bus line 101, and common bus line 103 are formed by patterning double metal layers (Mo/Al) which is deposited by sputtering an Al layer having a thickness of 2000 Å and a Mo layer having a thickness of 1000 Å in the named order. Gate insulator 112 is formed thereon by depositing an inorganic insulating layer such as silicon nitride having a thickness of 4000 Å by a chemical vapor deposition method. A semiconductor layer 115 and an $n^+$ semiconductor layer 116 are formed by depositing and etching an amorphous silicon (a-Si) layer having a thickness of 1700 Å and an $n^+$ a-Si layer having a thickness of 300 Å. Data bus line 102, data electrode 108, source electrode 106, and drain electrode 107 are formed by depositing and etching a Cr metal layer having a thickness of 1500 Å. Also, the gate and data bus line may be formed of high conductive metal layers such as Mo metal layer, Mo/Al/Mo triple metal layers, or Cr/Al/Cr triple metal layers in order to prevent signal delay in the gate and data bus lines which is generated by being overlapped with the common electrode.

The TFT and data electrode 108 are covered with a passivation layer 120 such as silicon oxide and silicon nitride having a thickness of 2000 Å. On passivation layer 120, common electrode 109 is formed by depositing and etching a transparent conducting layer such as indium tin oxide (ITO) having a thickness of 500 Å.

Over common electrode 109 and passivation layer 120, a first alignment layer 123a is formed by coating polyimide or polyamide or photo-alignment materials. The polyimide or polyamide alignment layer is rubbed to impart an alignment direction thereto. On the other hand, the photo-alignment layer such as polyvinylcinnamate (PVCN) or polysiloxane based materials is exposed to an ultraviolet light to impart an alignment direction thereto.

As shown in FIG. 2c, data and common electrodes 108 and 109 have portions for first and second storage capacitors whose capacitances are $C_{st1}$ and $C_{st2}$ respectively. Accordingly, the total storage capacitance ($C_{st}$) in the present invention becomes the sum of storage capacitances $C_{st1}$ and $C_{st2}$. The storage capacitor ($C_{st}$) is double the conventional storage capacitor ($C_{st1}$), so that the area for storage capacitor can be reduced to half the conventional area, thereby improving the aperture ratio.

As shown in FIG. 2b, on a second substrate 111, a black mask 128 and a color filter layer 129 are formed. An overcoat layer may be formed thereon to flatten and stabilize the surface. Black mask 128 prevents a leakage of light through the regions of TFT and gate, data and common bus lines 101, 102, and 103. Black mask 128 is made of a Cr or a CrOx metal layer having a thickness of 0.1 μm and a width of 10 μm. Color filter layer 129 has one of R, G, and B color filter elements in each pixel. On color filter layer 129, a second alignment layer 123b is formed by coating polyimide or photo-alignment materials. Second alignment layer 123b is rubbed or exposed to UV light to impart an alignment direction. A liquid crystal layer 130 is inserted between two substrates 110 and 111 by injecting liquid crystal in vacuum state.

Figure 3:
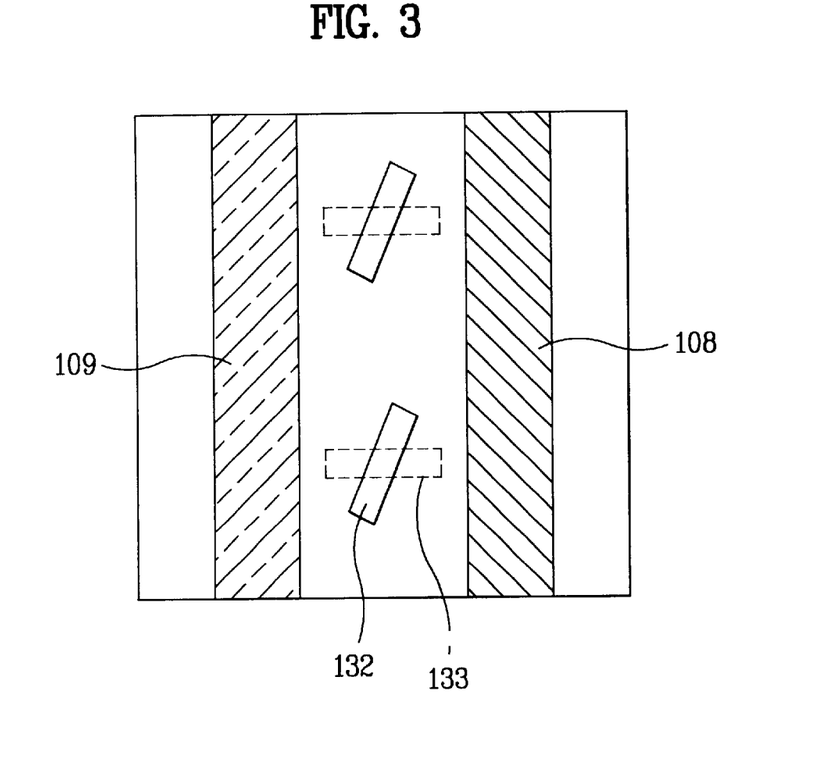
FIG. 3 is a view showing the operation of liquid crystal molecules in the first embodiment.
Figure 4:
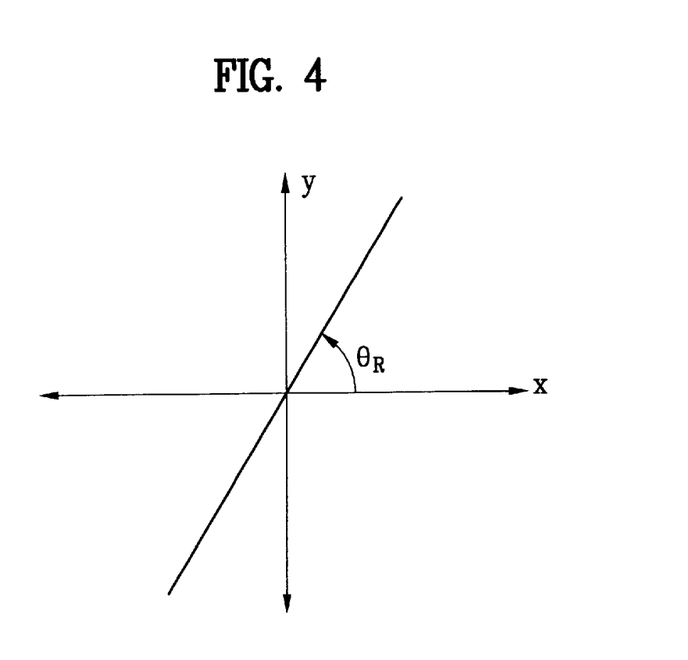
FIG. 4 is a view showing the alignment direction in the first embodiment.

FIG. 3 is a view showing the operation of liquid crystal molecules in the IPS mode LCD according to the present invention. FIG. 4 is a view showing the alignment direction, where the Y axis direction indicates the extension direction of data and common electrodes 108 and 109, and $\theta_R$ indicates the angle between the alignment direction and the X axis direction, which is the extension direction of data bus line 102. When a voltage is not applied to the device, the liquid crystal molecules are aligned according to the alignment direction. When a voltage is applied to the device, electric field parallel to the substrates is generated between common and data electrodes 109 and 108, and thereby liquid crystal molecules 132 rotates clockwise according to the electric field. In FIG. 3, a reference number 133 indicates the positions of the liquid crystal molecules after applying the voltage.

Figure 5:
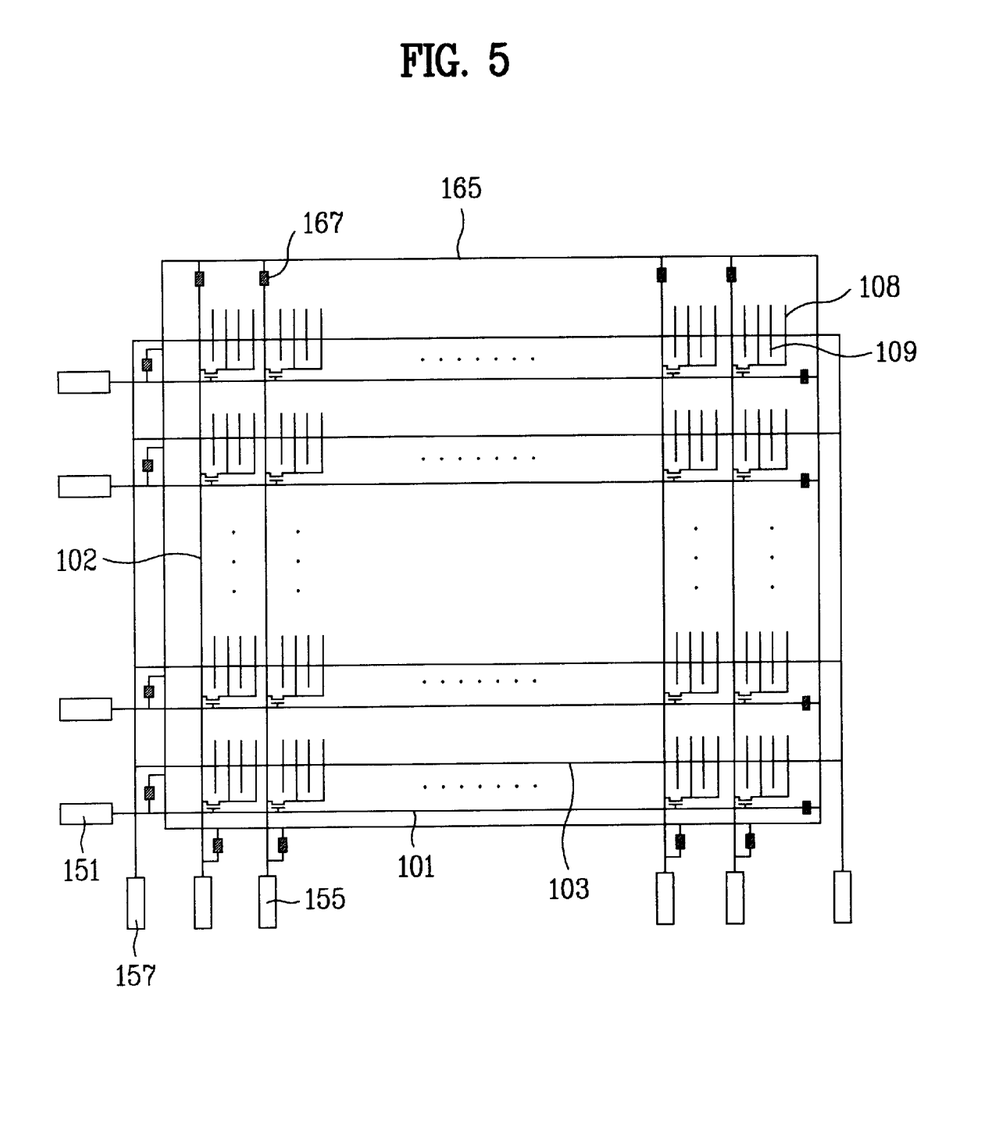
FIG. 5 is a plane view of the TFT array structure of the present invention.

FIG. 5 is a view showing the TFT array structure of the present invention. Gate and data bus lines 101 and 102 are connected to gate and data driving circuits through gate and data pads 151 and 155 respectively. Gate and data bus lines 101 and 102 are connected to a grounding wiring 165 through an electrostatic discharging circuit 167 composed of TFT. Also common bus line 103 is grounded through common pad 157.

Although not illustrated in the figure, gate, data and common pads 151, 155 and 157 are made of first, second and third metal layers. The first metal layer is formed of Mo/Al double metal layers together with gate electrode 105 and common bus line 103, as shown in FIGS. 2a, 2b, and 2c. The second metal layer is formed of Cr together with source and drain electrode 106 and 107. The third metal layer is formed of ITO together with common electrode 109. In order to connect the pads to the driving circuits, it is necessary to etch gate insulator 112 and passivation layer 120 in the pad region. The two insulating layers in the pad region are etched when hole 125 is formed. In the prior art, an oxide layer is generated on the pads by the exposure to the air, causing a problem that the contacting electric resistance is increased when connecting the pads to the driving circuits. However, in this embodiment, because the third metal layer of the pads is made of ITO to obtain an IOP (ITO On Passivation) structure, the above-mentioned problem is not generated.

Figure 6A:
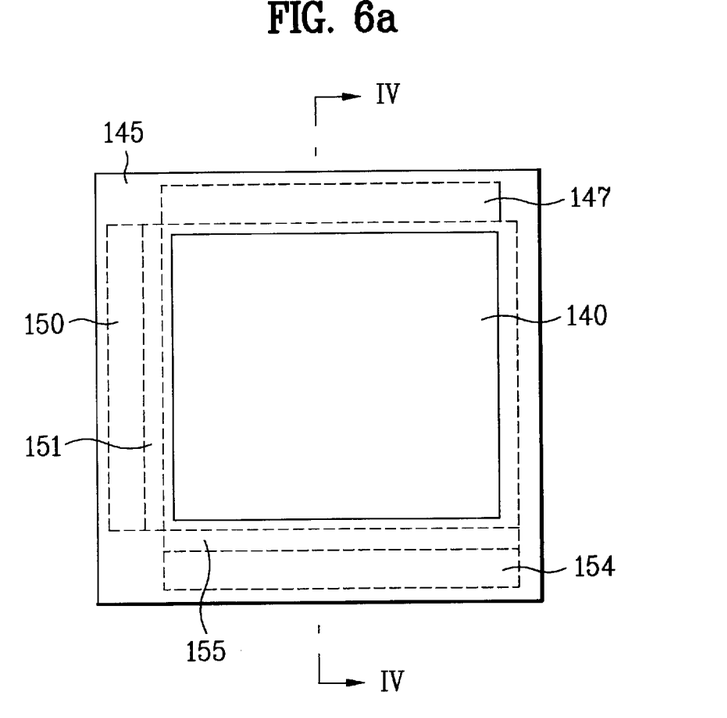
FIG. 6a and FIG. 6b are respectively plane and sectional views showing the structure of the IPS mode LCD according to the present invention.
Figure 6B:
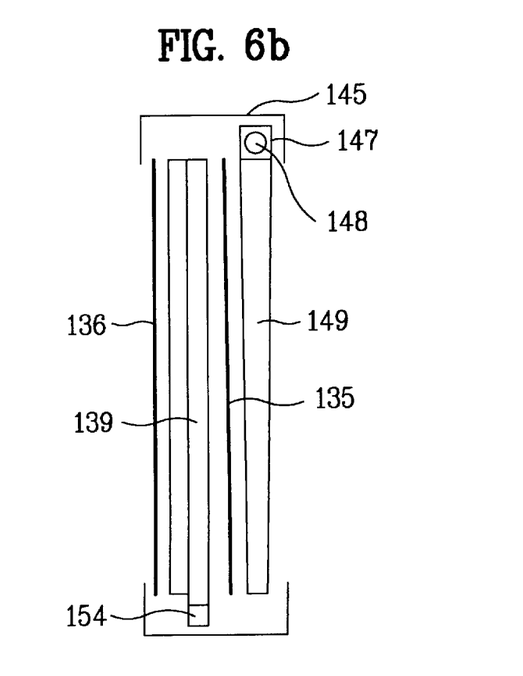

FIG. 6a and FIG. 6b are plane and sectional views showing the structure of the in-plane switching mode LCD consistent with the present invention, where FIG. 6b is a sectional view taken along line D–D' of FIG. 6a. As shown in these figures, gate and data driving circuits 150 and 154 are disposed in a frame 145 outside display region 140. Gate and data driving circuits 150 and 154 are connected to gate and data bus lines 101 and 102 through gate and data pads 151 and 154 respectively. A backlight housing 147 is disposed on the upper side of frame 145. In backlight housing 147, a backlight 148 is disposed to project a light into a liquid crystal panel 139 through a light pipe 149. Between light pipe 149 and liquid crystal panel 139, a polarizer 135 is disposed to polarize the light linearly. An analyzer 136 is disposed on the front of panel 139.

The advantages of the first embodiment according to the present invention are summarized as follows.

First, passivation layer 120 and gate insulator 112 (shown in FIGS. 2b and 2c) do not absorb the electric field applied to liquid crystal layer 130 because common electrode 109 is disposed above two insulating layers 112 and 120. Accordingly, the driving voltage is lowered.

Second, because the areas for storage capacitor can be decreased, the aperture ratio is much more improved.

Third, because common electrode 109 overlaps gate and data bus lines 101 and 102 to block the electric effect of two bus lines 101 and 102, the crosstalk problem can be eliminated. Accordingly, the pixel region can be enlarged, improving the aperture ratio.

Fourth, because common electrode 109 is formed of ITO to obtain an IOP structure, the contacting electric resistance between the pads and the driving circuits is decreased, and the aperture ratio is improved.

Figure 7:
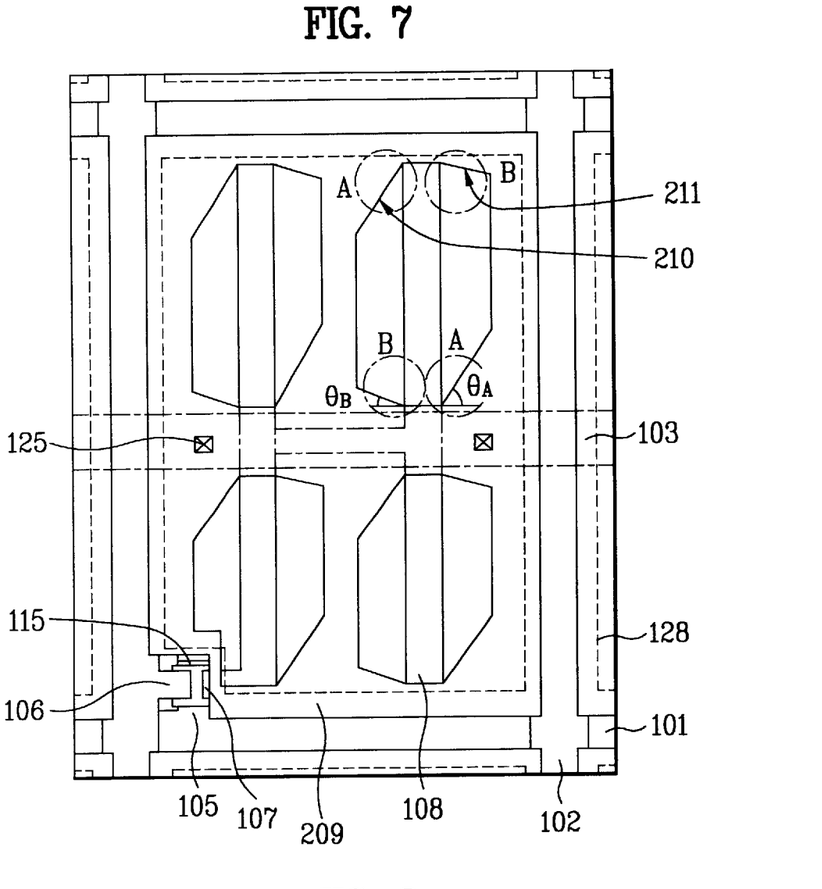
FIG. 7 is a plane view of a second embodiment of the present invention.
Figure 8:
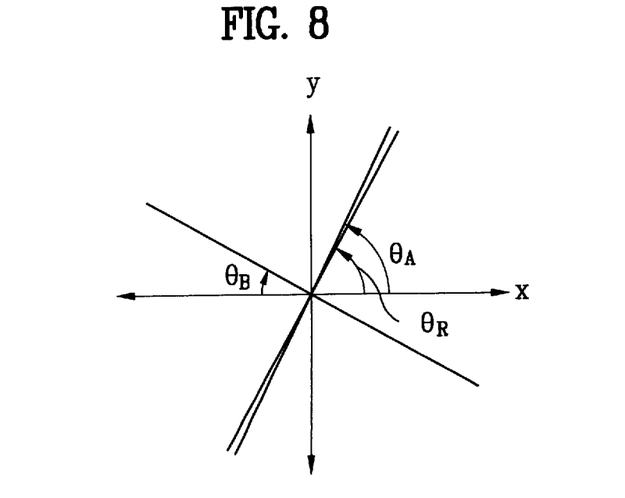
FIG. 8 is a view showing the alignment direction and the direction of first and second oblique sides of the second embodiment.

FIG. 7 is a view showing a second embodiment of the present invention. Hereinafter, constituent elements similar to those of the first embodiment are denoted by the same reference numbers. As shown in this figure, this embodiment differs from the first embodiment in that a common electrode 209 has first and second oblique sides 210 and 211. FIG. 8 is a view showing the alignment direction and the direction of the first and second oblique sides of the second embodiment, where Y axis indicates the extension direction of the data electrode 108. In region A of FIG. 7, first oblique side 210 is inclined counterclockwise from the X axis with an angle $\theta_A$. In region B, second oblique side 210 is inclined clockwise from the X axis with an angle $\theta_B$. The alignment direction is determined to be inclined counterclockwise to X axis direction with an angle $\theta_R$ in the range of 0 to 90°. Angle $\theta_A$ is determined to be in the range of $\theta_R$ to 90°. The angle $\theta_B$ is determined to be in the range of 90°–$\theta_R$ to 90°. The figures show a case where the angle $\theta_R$ is larger than 45°, and therefore the angle $\theta_A$ is larger than the angle $\theta_B$. On the contrary, when the angle $\theta_R$ is smaller than 45°, the angle $\theta_B$ is determined to be larger than the angle $\theta_A$.

The object of this embodiment is to prevent the problem of the first embodiment, in which disclination may be generated in the region where common electrode 209 crosses with data electrode 109.

Figure 9A:
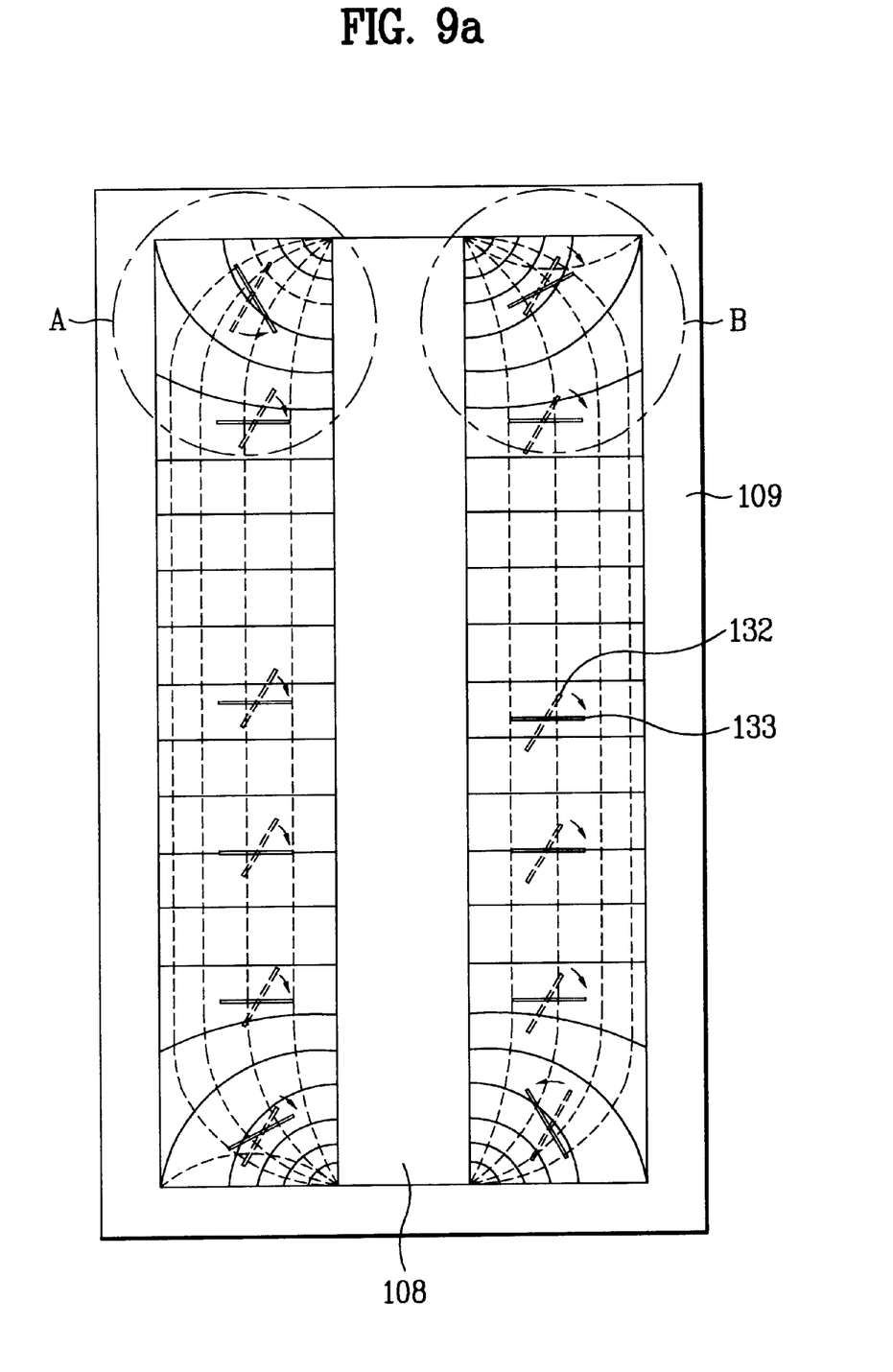
FIG. 9a and FIG. 9b are views showing the direction of electric field and the operation of LC molecules in the first and second embodiments respectively.

In the first embodiment, the electric field is generated between common and data electrodes 108 and 109 as shown in FIG. 9a. In the middle region of the opening portion, the direction of electric field is perpendicular to the extension direction of electrodes 108 and 109. When voltage is applied to the device, in the middle region, LC molecules 132 are given a clockwise turning force according to the electric field perpendicular to the extension direction of electrodes 108 and 109, and thereby they rotate clockwise to be aligned perpendicular to the extension direction of the electrodes.

On the other hand, in regions A and B where common electrode 109 crosses with data electrode 108, an electric field is deformed not to be perpendicular to the extension direction of electrodes 108 and 109. When the voltage is applied to electrodes 108 and 109, in regions A and B, LC molecules 132 are aligned to be different from the middle region. Particularly in the region bounded by chain lines, the LC molecules are given with a counterclockwise turning force according to the deformed electric field, and thereby they rotate in opposite direction to those in the middle region. Consequently, in the border region denoted by chain lines, the alignment of LC molecules 132 is not defined, thereby generating disclination. Particularly when using liquid crystal having a low viscosity for lowering the driving voltage, since the interaction between LC molecules 132 is weak, a possibility of generating the disclination is increased to deteriorate the image quality. In this figure, reference number 133 denotes LC molecules after applying the voltage.

Figure 9B:
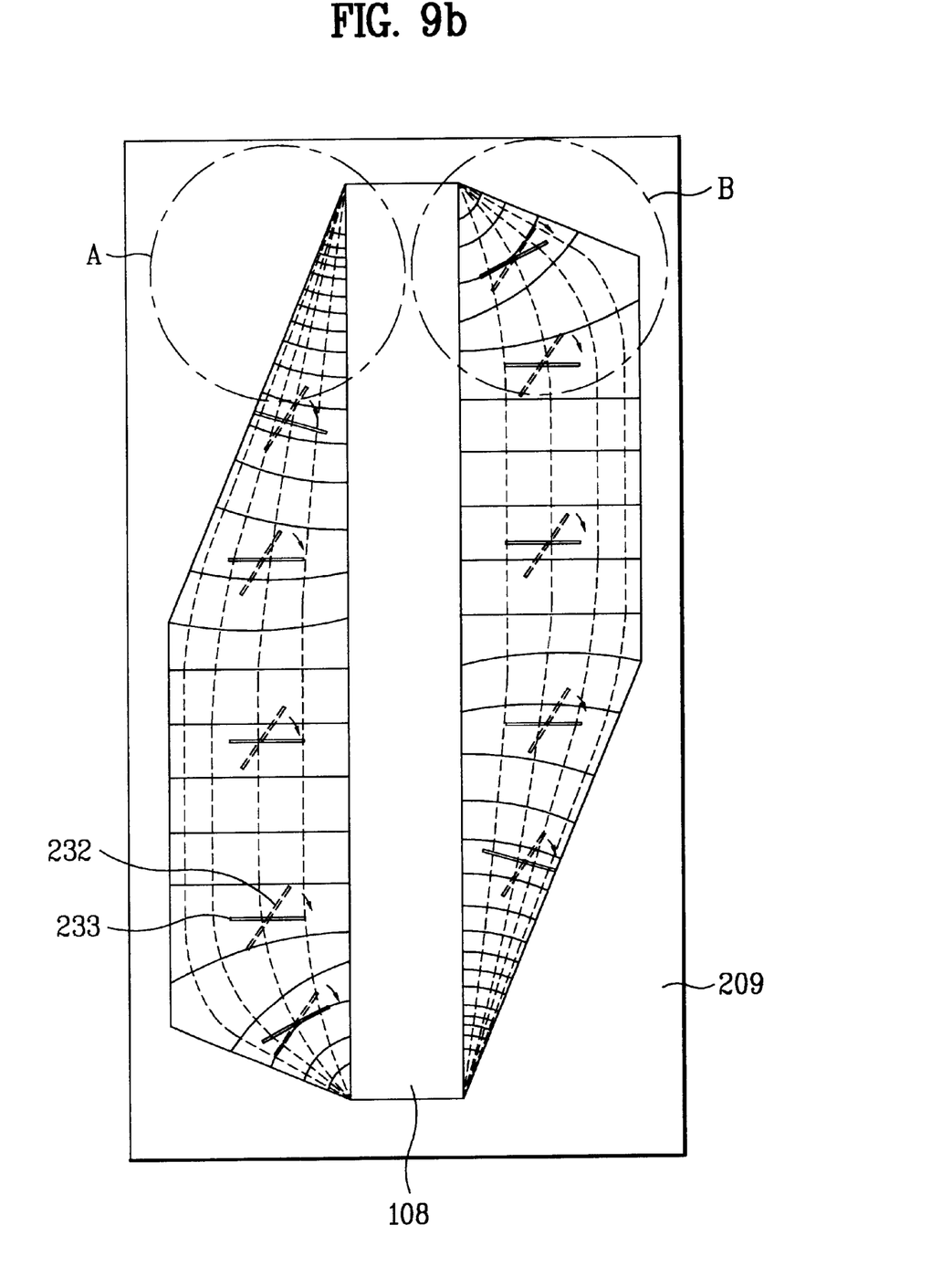

However, in the second embodiment, since common electrode 209 has first and second oblique sides 210 and 211, as shown in FIG. 7, the electric field is slightly deformed in regions A and B, as shown in FIG. 9b. The electric field gives a clockwise turning force to LC molecules 232 in regions A and B. Accordingly, although using liquid crystal having a low viscosity for lowering the driving voltage, LC molecules 232 in regions A and B rotate in the same direction with those in the middle region, thereby preventing the disclination. In FIG. 9b, reference number 233 denotes LC molecules after applying the voltage.

The second embodiment has an aperture ratio lower than the first embodiment, and however has a more improved image quality by preventing the disclination. In this case, it is preferable to form common electrode 209 out of ITO for improving the aperture ratio.

Figure 10A:
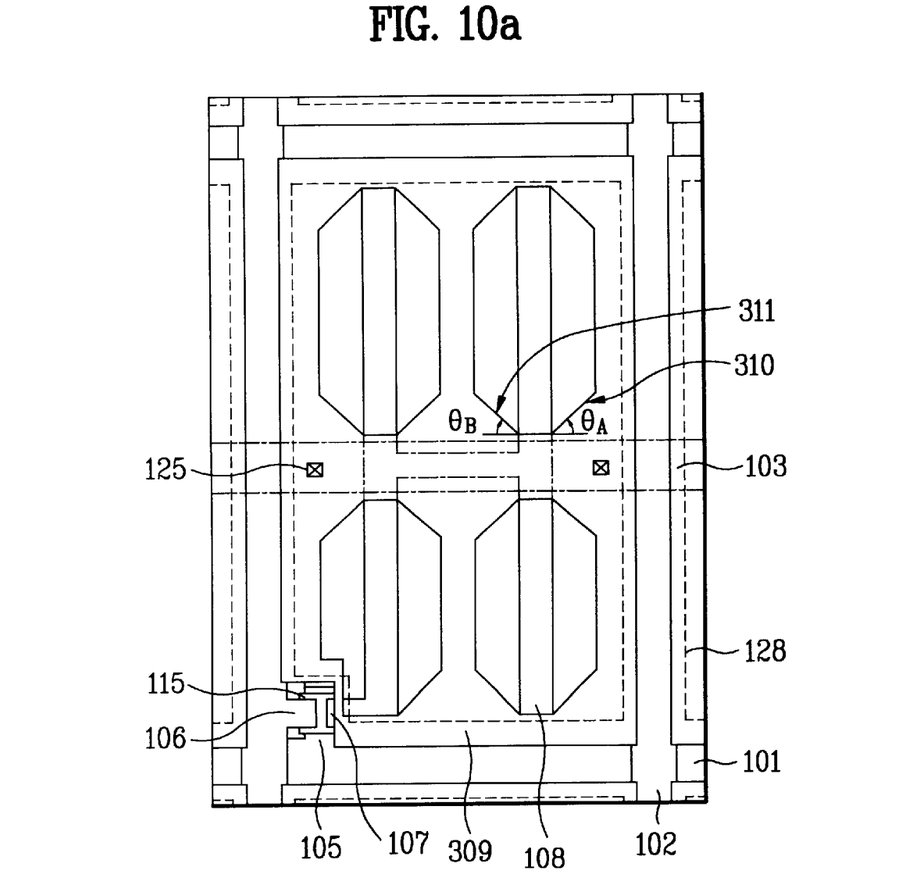
FIG. 10a is a plane view showing a third embodiment of the present invention.
Figure 10B:
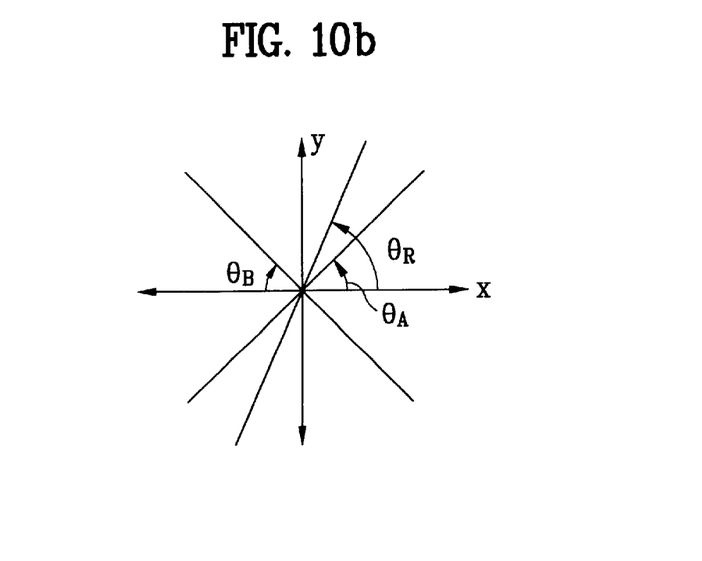
FIG. 10b is a view showing the alignment direction and the direction of first and second oblique sides of the third embodiment.

FIG. 10 is a view showing a third embodiment. This embodiment is similar to the second embodiment except for angles $\theta_A$ and $\theta_B$ of common electrode 309. In this embodiment, angles $\theta_A$, $\theta_B$ and $\theta_R$ are approximately 45°, 45°, and 75° respectively. In region B, because angle $\theta_B$ is in the range of 90°−$\theta_R$, to 90°, the LC molecules are given with a clockwise turning force, thereby not generating the disclination. On the other hand, in region A, since the angle $\theta_A$ is out of the range of $\theta_R$ to 90°, the LC molecules are given a counterclockwise turning force.

However, the disclination is not generated in the region A because there is an interaction between the liquid crystal molecules when using a usual liquid crystal.

Figure 11A:
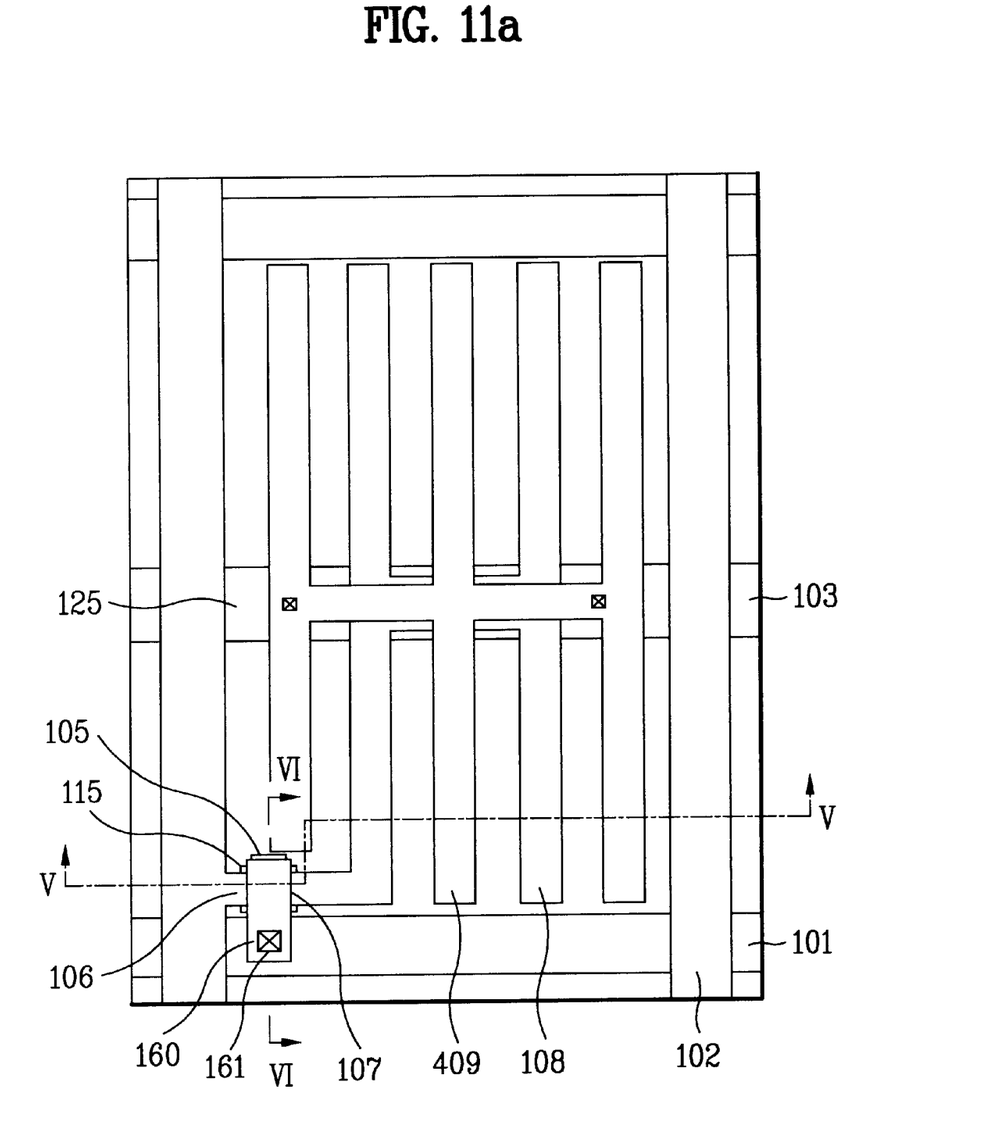
FIG. 11a is a plane view showing a fourth embodiment of the present invention.
Figure 11B:
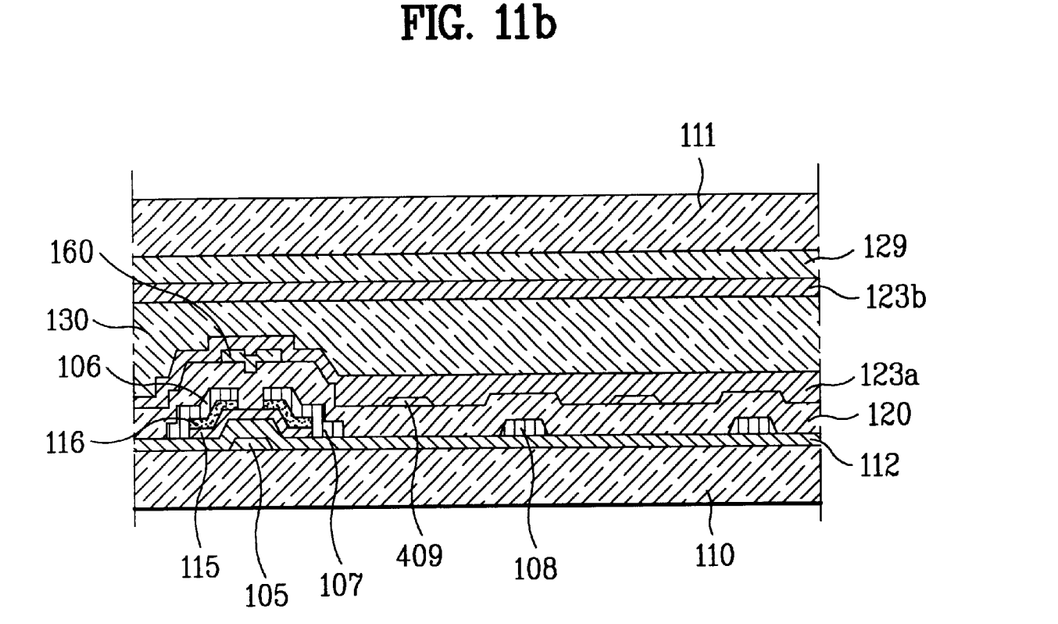
Figure 11C:
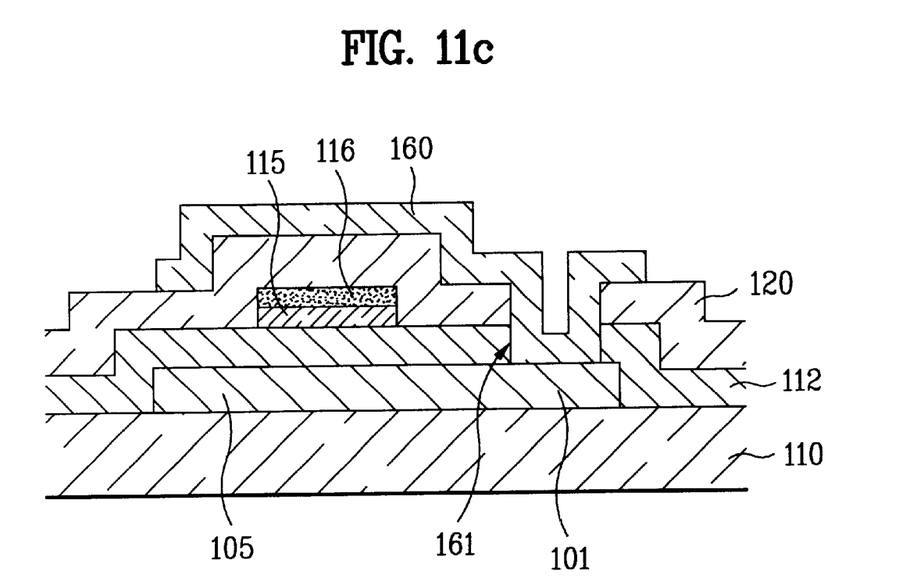

FIGS. 11a, 11b, and 11c are plane and sectional views showing the fourth embodiment, where FIGS. 11b and 11c are sectional views taken along lines E–E' and F–F' of FIG. 11a respectively.

In this embodiment, as shown in these figures, data and common electrodes 108 and 409 have portions for first and second storage capacitors as in the previous embodiments. This embodiment differs from the previous embodiments in that the common electrode does not overlap gate and data bus lines 101 and 102, and a light shielding electrode 160 is formed on passivation layer 120 in the region of the TFT. Common electrode 409 and light shielding electrode 160 are formed together by sputtering and etching Mo metal layer having a thickness of 1000 Å. Because light shielding electrode 160 functions as a black mask for the TFT, as shown in FIG. 11b, the black mask is not formed in the region of TFT. To obtain an IOP structure, two electrodes 409 and 160 are formed of metal layers including ITO, and it is preferable that they are formed of a double layer ITO/Mo which is formed by depositing Mo metal layer and ITO in the named order. Light shielding electrode 160 is formed to overlap a portion of gate bus line 101 so as to be connected with gate bus line 101 through a second hole 161 formed in gate insulator 112 and passivation layer 120. Accordingly, light shielding electrode 160 is provided with the same voltage as gate electrode 105.

In this embodiment, light shielding electrode 160 overlaps the TFT with passivation layer 120 interposed therebetween in order to prevent a light incident on semiconductor layer 115 of the TFT. Accordingly, there is no need to form a black mask in the region of TFT, decreasing the fabricating cost. Further, the leakage current is prevented which is generated by excitation of semiconductor layer 115 when semiconductor layer 115 is exposed to light, so that a backlight having a high light intensity can be used improving the luminosity of the device.

In addition, since light shielding electrode 160 is connected with the gate bus line for obtaining the same voltage as gate electrode 105, it functions as a back gate electrode increasing the switching current of the TFT. Accordingly, switching speed of the TFT is increased so that the same switching speed as the prior art can be obtained using TFT of relatively small size.

Figure 12:
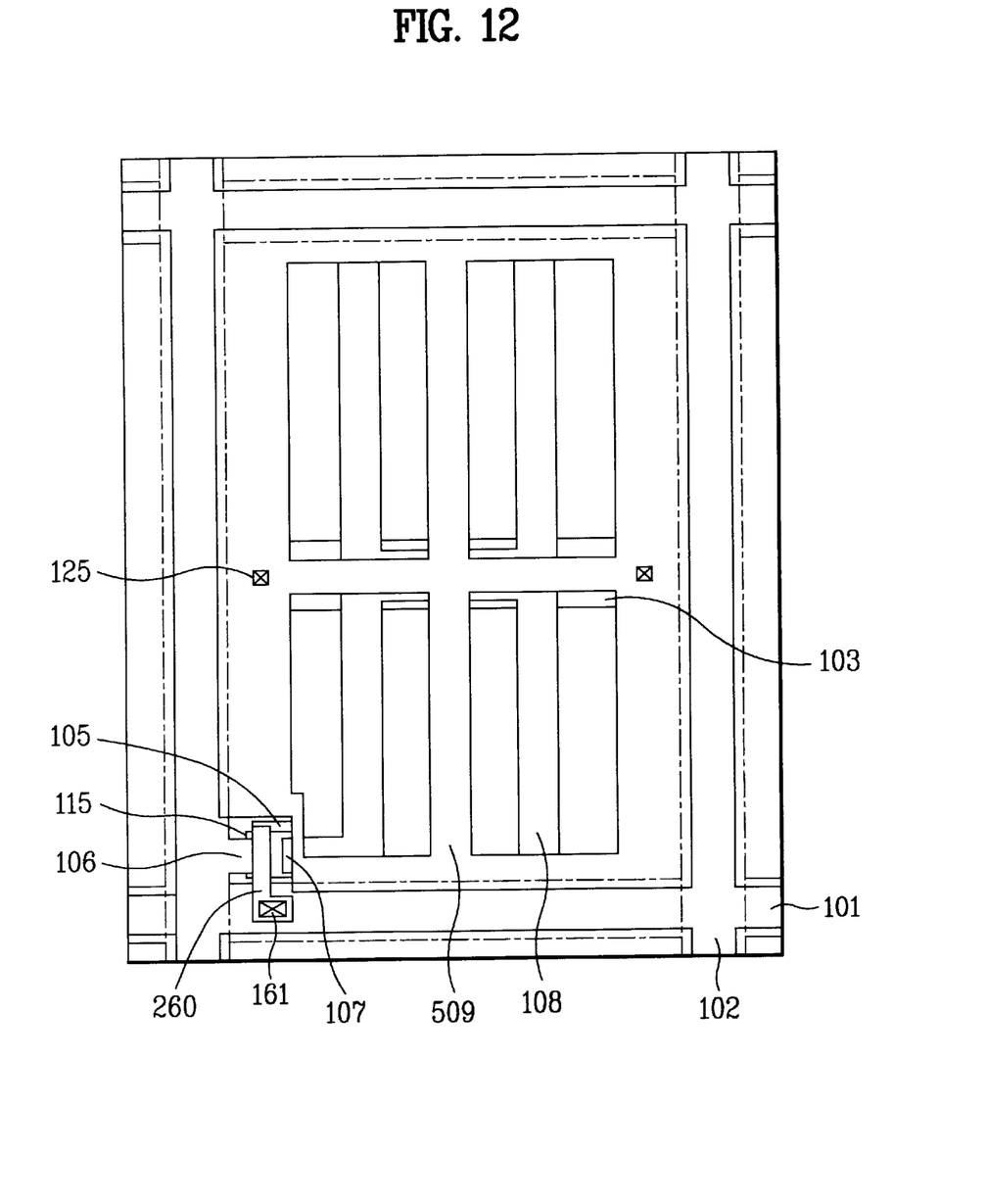
FIG. 12 is a plane view showing a fifth embodiment of the present invention.

FIG. 12 is a view showing a fifth embodiment. As shown in this figure, this embodiment is similar to the fourth embodiment except that a common electrode 509 overlaps gate and data bus lines 101 and 102 as in the first, second, and third embodiments.

Common electrode 509 and a light shielding electrode 260 are formed of opaque metals as the fourth embodiment, and function as a light shielding layer so that there is no need to form a black mask in the regions of the TFT, and two bus lines 101 and 102. Accordingly, the fabricating cost for the black mask is reduced, and prevented is the conventional problem in that the aperture ratio is lowered by having to compensate for imprecise lamination when forming the black mask on the second substrate. Further, as in the fourth embodiment, light shielding electrode 260 prevents a light incident on the active layer.

In the first, second, third, and fifth embodiments, a parasitic capacitor may be formed between the common electrode and the gate and data bus lines, causing the signal delay in the two bus lines. This signal delay problem can be eliminated by forming the gate and data bus lines out of low resistance metal layers such as Mo metal layer, Mo/Al/Mo triple metal layers or Cr/Al/Cr triple metal layers.

The present invention is characterized in that the common electrode is formed on passivation layer 120, and the data and common electrodes have portions for first and second storage capacitors. Accordingly, passivation layer 120 and gate insulator 112 do not absorb the electric field applied to liquid crystal layer 130 because the common electrode is disposed above two insulating layers 112 and 120. Accordingly, the driving voltage is lowered. Further, because the areas for storage capacitor can be decreased, the aperture ratio is much more improved. Furthermore, because the common electrode is formed out of ITO for obtaining IOP structure, the contacting electric resistance between the pads and the driving circuits 16 decreased as well as the aperture ratio is improved.

In first, second, third, and fifth embodiments according to the present invention, because the common electrode overlaps the gate and data bus lines to block the electric effect of the two bus lines, the crosstalk problem can be removed. Accordingly, the pixel region can be enlarged improving the aperture ratio.

In fourth and fifth embodiments, the light shielding electrode functions as a back gate electrode for increasing the switching speed of TFT, and prevents a leakage current caused by excitation of the active layer. Particularly in the fifth embodiment, since the light shielding electrode and the common electrode function as a black mask, there is no need to form the black mask in the regions of TFT and the two bus lines 101 and 102, removing the problems generated when forming the black mask on the second substrate.

It will be apparent to those skilled in the art that various modifications and variations can be made in the in plane switching mode liquid crystal display device of the present invention and in construction of this device without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display comprising:
    a first substrate;
    a second substrate;
    a liquid crystal layer between the first substrate and the second substrate;
    a plurality of gate bus lines and data bus lines over the first substrate defining a plurality of pixel regions;
    a plurality of common bus lines, at least one common bus line intersecting at least one pixel region;
    a first insulative layer over the at least one common bus line in the pixel region;
    a data electrode over the first insulative layer, a portion of the data electrode overlying the common bus line to form a first capacitor;
    a second insulative layer over the data electrode; and
    a common electrode over the second insulative layer, a portion of the common electrode overlying the data electrode to form a second capacitor, the common electrode having a plurality of openings formed therein, at least one of the openings having a shape in the form of a polygon.

2. The display of claim 1, wherein the polygon has four sides.

3. The display of claim 1, wherein the polygon is a rectangle.

4. The display of claim 1, where the polygon comprises a first pair of parallel sides and at least one additional side, the at least one additional side being connected to one of the first pair of parallel sides at a first point such that an interior angle formed at the first point is obtuse.

5. The display of claim 4, wherein the polygon further comprises a second pair of parallel sides, the at least one additional side further being connected to one of the second pair of parallel sides at a second point such that an interior angle formed at the second point is also obtuse.

6. The display of claim 5, wherein the first pair of parallel sides has a first direction, the second pair of parallel sides has a second direction, and the first direction is perpendicular to the second direction.

7. The display of claim 1, wherein the polygon has eight sides.

8. The display of claim 7, wherein the eight sides comprise four pairs of parallel sides.

9. The display of claim 8, wherein both sides in a pair of parallel sides have a same length.

10. The display of claim 9, wherein all sides in at least two pairs of parallel sides have a same length.

11. A liquid crystal display, comprising:
    a substrate;
    a plurality of gate bus lines and data bus lines over the first substrate defining a plurality of pixel regions;
    each of the pixel regions having a common bus passing therethrough;
    a first insulative layer over the common bus;
    a data electrode over the insulative layer and a portion of the common bus to form a first capacitor;
    a second insulative layer over the data electrode; and
    a common electrode over the second insulative layer and a portion of the data electrode to form a second capacitor.

12. The display of claim 11, wherein a portion of the data electrode forms part of both the first and second capacitors.

13. The display of claim 12, wherein the common electrode at least partially overlies a gate bus line.

14. The display of claim 12, wherein the common electrode at least partially overlies a data bus line.

15. The display of claim 12, wherein the common electrode at least partially overlies a data bus line and a gate bus line.

16. The display of claim 12, wherein the common electrode includes a plurality of spaced apart parallel extensions in a first direction, and the data electrode includes a plurality of spaced apart parallel extensions in a second direction.

17. The display of claim 16, wherein the first direction is parallel to the second direction.

18. The display of claim 17, wherein the common electrode further includes a portion perpendicular to the parallel extensions in the first direction and the data electrode includes a portion perpendicular to the parallel extensions in the second direction.

19. The display of claim 12, wherein the common electrode includes a plurality of openings.

20. The display of claim 12, wherein the openings are in the shape of a polygon.

21. The display of claim 20, wherein the polygon has four sides.

22. The display of claim 20, wherein the polygon has more than four sides.

23. The display of claim 20, wherein the polygon has at least one pair of parallel sides.

24. The display of claim 20, wherein the polygon has at least two pairs of parallel sides.

25. The display of claim 20, wherein the polygon has at least three pairs of parallel sides.

26. The display of claim 20, wherein the polygon has at least four pairs of parallel sides.

27. The display of claim 20, wherein all interior angles of the polygon are obtuse.

* * * * *